United States Patent [19]

Lavins, Jr. et al.

[11] 4,017,703
[45] Apr. 12, 1977

[54] MULTIPLE STATION INDUCTION HEATING MACHINE

[75] Inventors: Paul N. Lavins, Jr., Grosse Pointe Farms, Mich.; Willard J. Vanek, Walton Hills, Ohio

[73] Assignee: American Induction Heating Corporation, Detroit, Mich.

[22] Filed: Dec. 17, 1975

[21] Appl. No.: 641,448

[52] U.S. Cl. .................... 219/10.69; 219/10.57; 266/129; 269/57
[51] Int. Cl.² .................................. H05B 5/06
[58] Field of Search ......... 219/10.69, 10.71, 10.73, 219/10.67, 10.57, 10.79, 10.41, 10.43; 266/129; 76/103, DIG. 2; 269/57, 47, 56, 58, 63, 315, 318, 321 W

[56] References Cited

UNITED STATES PATENTS

| | | | |
|---|---|---|---|
| 2,445,822 | 7/1948 | Briechle | 219/10.69 |
| 2,470,285 | 5/1949 | Bienwirth | 219/10.69 |
| 2,697,161 | 12/1954 | Lyness | 219/10.67 |
| 3,777,096 | 12/1973 | DelPaggio | 219/10.57 |

FOREIGN PATENTS OR APPLICATIONS 1,028,784  5/1966  United Kingdom ............ 219/10.69

*Primary Examiner*—Bruce A. Reynolds
*Attorney, Agent, or Firm*—Krass & Young

[57] ABSTRACT

Transfer apparatus for performing heat treating operations on both ends of a hammer head includes a dial indexing table having work supporting fixtures spaced about its perimeter.

18 Claims, 10 Drawing Figures

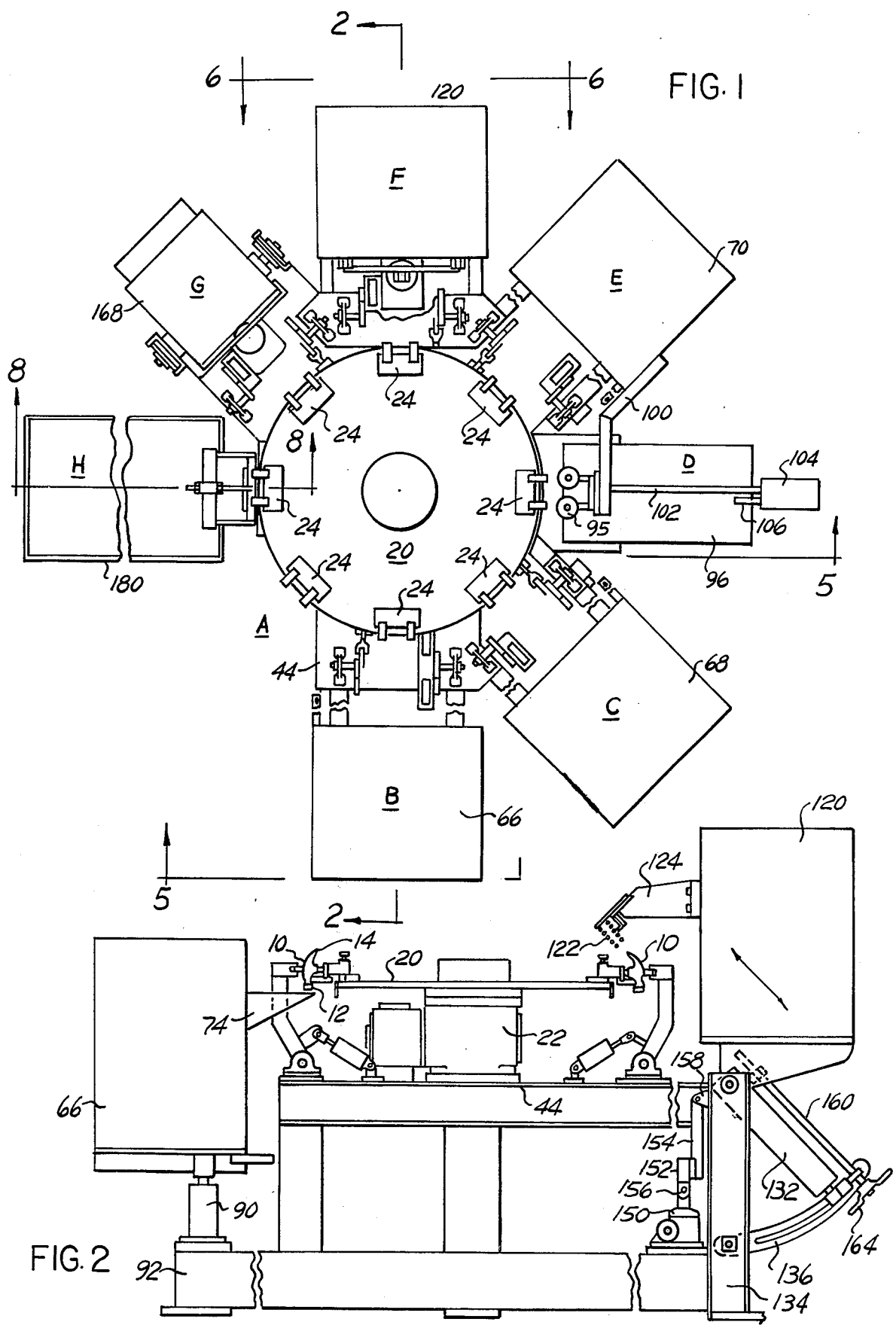

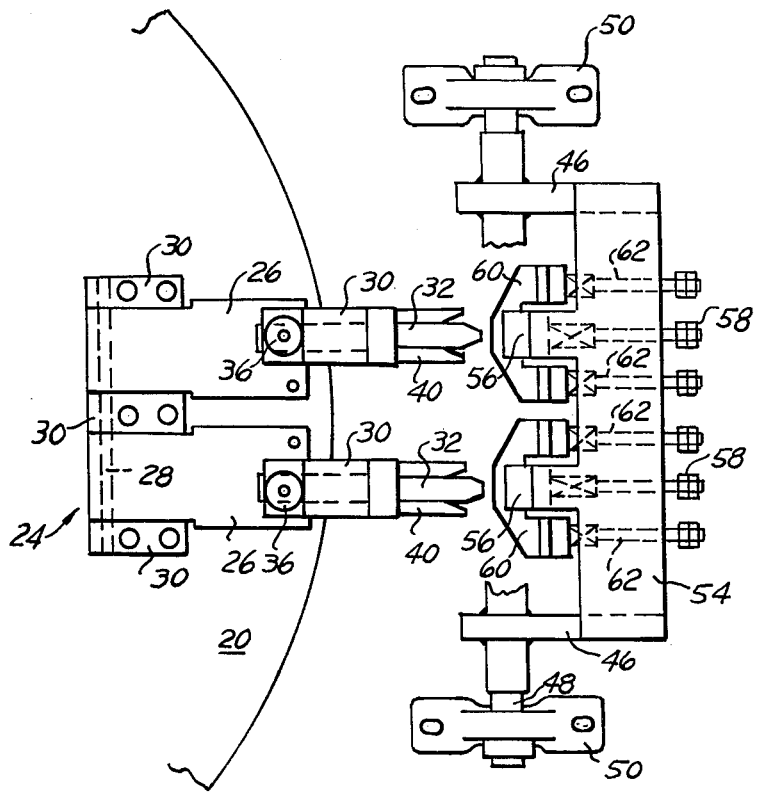
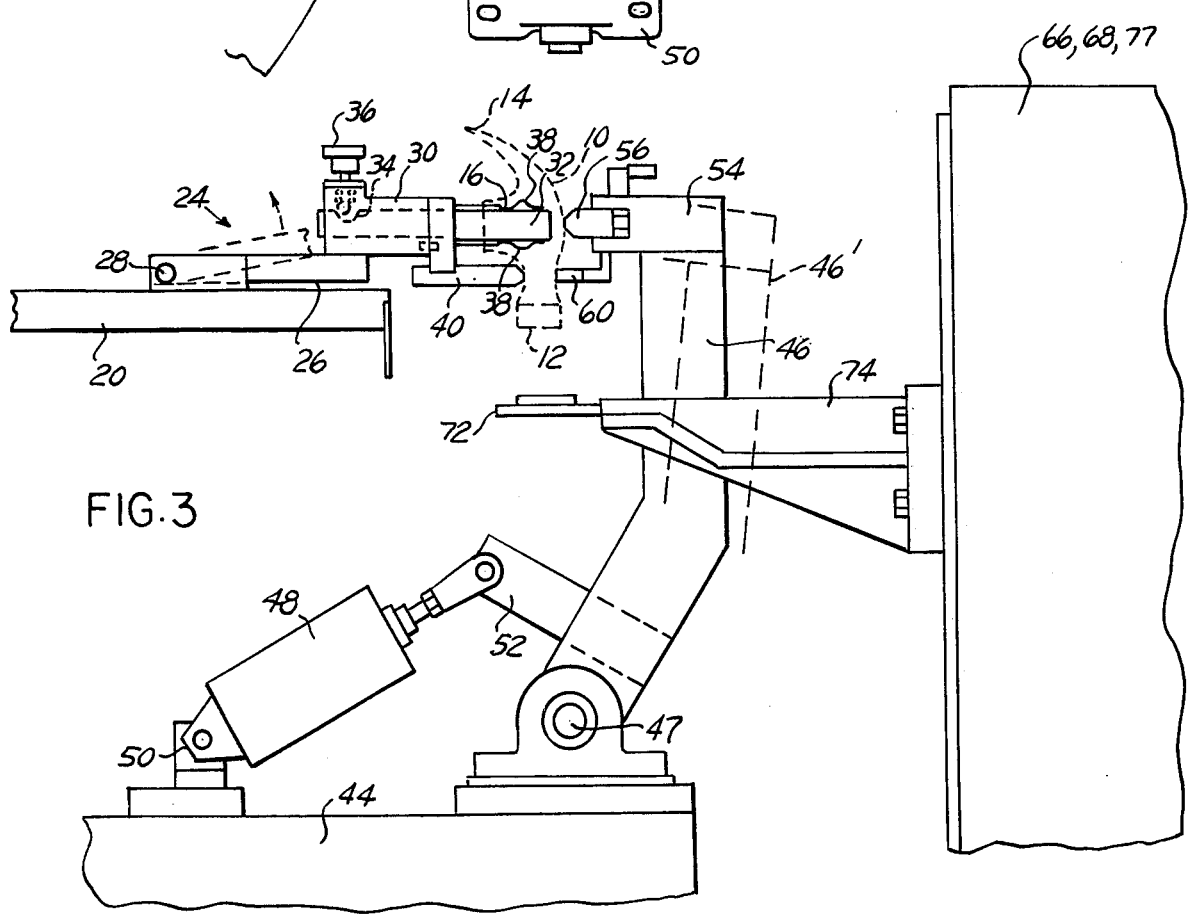

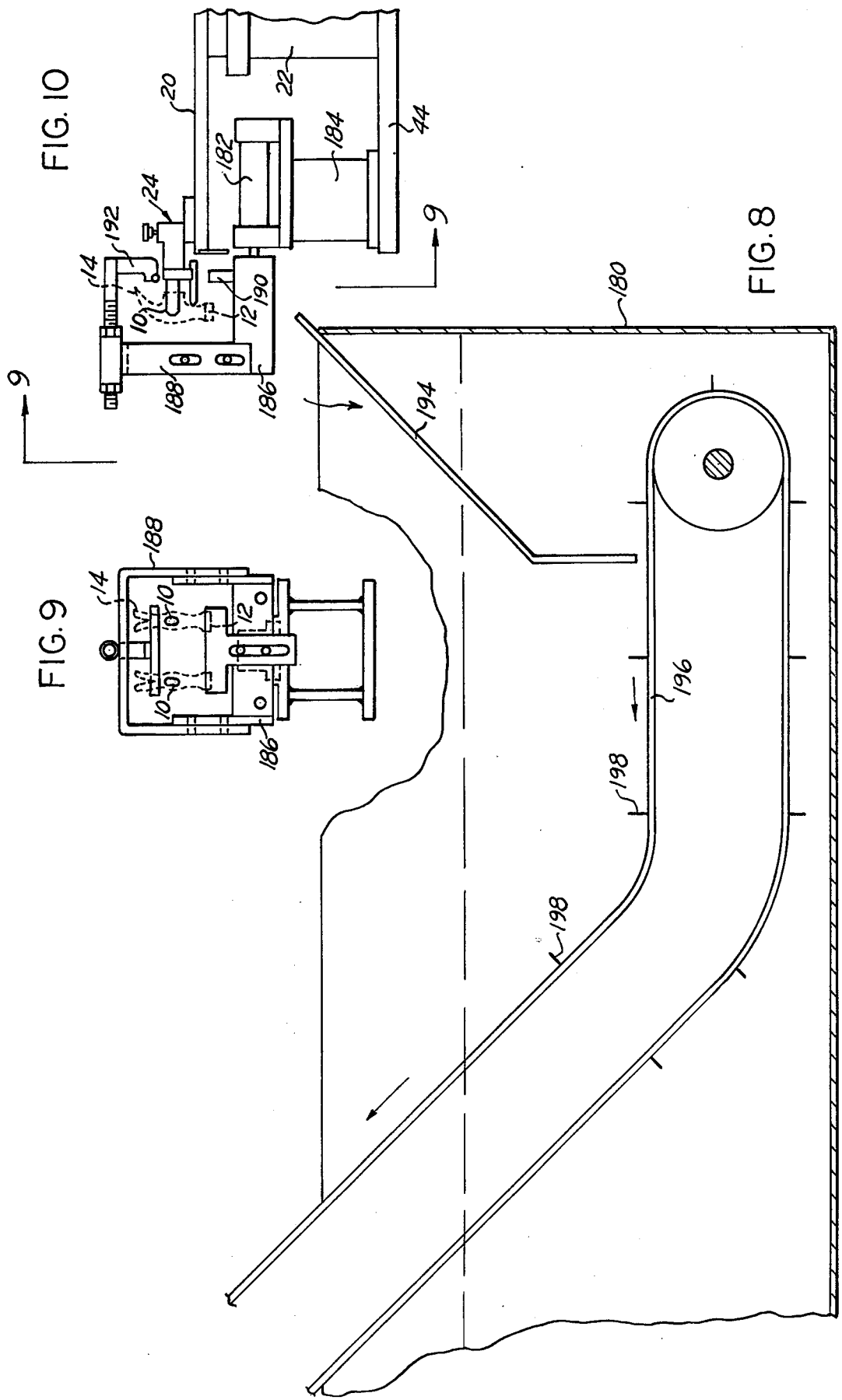

MULTIPLE STATION INDUCTION HEATING MACHINE

1. FIELD OF THE INVENTION

This invention relates to transfer apparatus employing a plurality of induction heating stations to perform operations on both ends of a elongated workpiece.

2. BACKGROUND OF THE INVENTION

Transfer devices such as chain conveyors, walking-beam drives and the dial index tables are often employed to move workpieces through a series of work stations so that a plurality of operations may be sequentially performed on them. These operations may include heating the part, as through an induction heating coil, either for purposes of altering the metallurgic condition of the part for heat treating purposes or to allow subsequent shaping operations such as forging.

One of the problems associated with these multiple station transfer machines is the difficulty of supporting the workpiece on the transfer mechanism in such a way as to avoid interference with the operating mechanism. Particular difficulty is encountered when operations must be performed on two separated sections of a workpiece. Often it is necessary to provide a transfer arm which removes a workpiece from the work holder and either inverts it and inserts it back in the work holder or places it in a second work holder. This mechanism is complicated and difficult to maintain in good operating order.

Difficulty is also encountered in supporting workpieces so that they may be heated through use of induction heating coils since the coil must necessarily surround the section to be heated, requiring that such section be clear of obstructions.

SUMMARY OF THE INVENTION

The present invention is directed to a transfer apparatus for performing a series of heat treating operations on two ends of metallic workpieces in general and hammer heads in particular. The workpieces are supported on fixtures arranged at regular intervals around the perimeter of a rotary table driven by an indexing mechanism. The fixtures project radially outward from the table so that the workpieces are supported beyond the perimeter of the table and thus access may be had to them from their sides and bottom as well as their tops.

In the preferred embodiment of the invention the workpieces comprise hammer heads each having a hammering face at one end and a claw or peen at the other end. The work support fixtures primarily consist of locators extending outward from the edge of the table adapted to support the hammer heads by projecting into the handle hole formed laterally through the center of each head.

Thus supported on the fixtures, the hammer heads are moved sequentially through a plurality of working stations as the table indexes. At certain of the working stations lock members swing into position against the outer sides of the hammer heads, to insure accurate location and retain them more securely on the fixtures. In this series of operations, one end of the hammer is first inductively heated and then quenched and then the other end is heated and then quenched. In the preferred embodiment of the invention, one of the quenches is followed by a tempering heat treatment.

The heating of the face end is achieved in two successive induction heating stations; the first pre-heats the work and the second raises it to hardening temperature. This entire heat treating operation could be performed at one station, but the time required would unacceptably slow the flow of parts through the system. The heating of the claw end is preferably performed in two successive stations, one employing a relatively low frequency induction heating current to heat the relatively thick part of the claw, the other operating at a higher frequency to induce heat in the relatively thin end of the claw.

The broad concepts of the present invention could be applied to any form of generally elongated workpiece which requires heat treatment at both its ends. Other, more specific aspects of the invention are applicable only to the heating of workpieces having configurations very similar to the hammer heads which are operated upon in a preferred embodiment of the invention.

In order to accurately position the induction heating coils which operate upon the hammer faces, the heads are supported on their locators with the faces projecting downwardly on the index table so that they may pivot upwardly in response to an upward force exerted upon the hammer head. The induction heating coil for the face and a locating pin fixed centrally with respect to the coil are moved upwardly so that the pin contacts and slightly lifts the hammer face. This insures accurate positioning of the heating coil independent of dimensional variations in the rough forged hammer heads. At the stations where the claw is heated, the induction heating coils move over the claws at the angle of the claws. These work stations are adjustable so as to accommodate hammer claws or other workpiece surfaces which form any angle with respect to the central axis of the workpiece.

In all of the induction heating stations, the induction heating coils move into position with respect to the work, carried on relatively large heating stations which include the step-down induction heating transformer and associated power factor adjustment components. This eliminates the need for expensive and inefficient flexible water cooled cables for connecting the induction heating coils to the transformers.

Other objectives, advantages and applications of the present invention will be made apparent from the following detailed description of a preferred embodiment of the invention. The description makes reference to the accompanying drawings in which:

FIG. 1 is a top view of dial transfer apparatus for performing a plurality of heat treat operations on both ends of hammer heads;

FIG. 2 is an elevation sectional view through the apparatus taken along lines 2—2 of FIG. 1 with parts broken away for purposes of illustration;

FIG. 3 is a detailed sectional view of a station for inductively heating the face of the hammer illustrating typical apparatus for retaining a hammer head in secured engagement with the transfer support apparatus;

FIG. 4 is a partial top view of the apparatus illustrated in FIG. 3;

FIG. 8 is a sectional view through the mechanism for ejecting the hammer head from the dial table into a final quench bath taken along line 8—8 of FIG. 1; and FIG. 9 is a front view of the hammer ejection station of FIG. 8, taken along lines 9—9 of FIG. 8.

Figure 5:
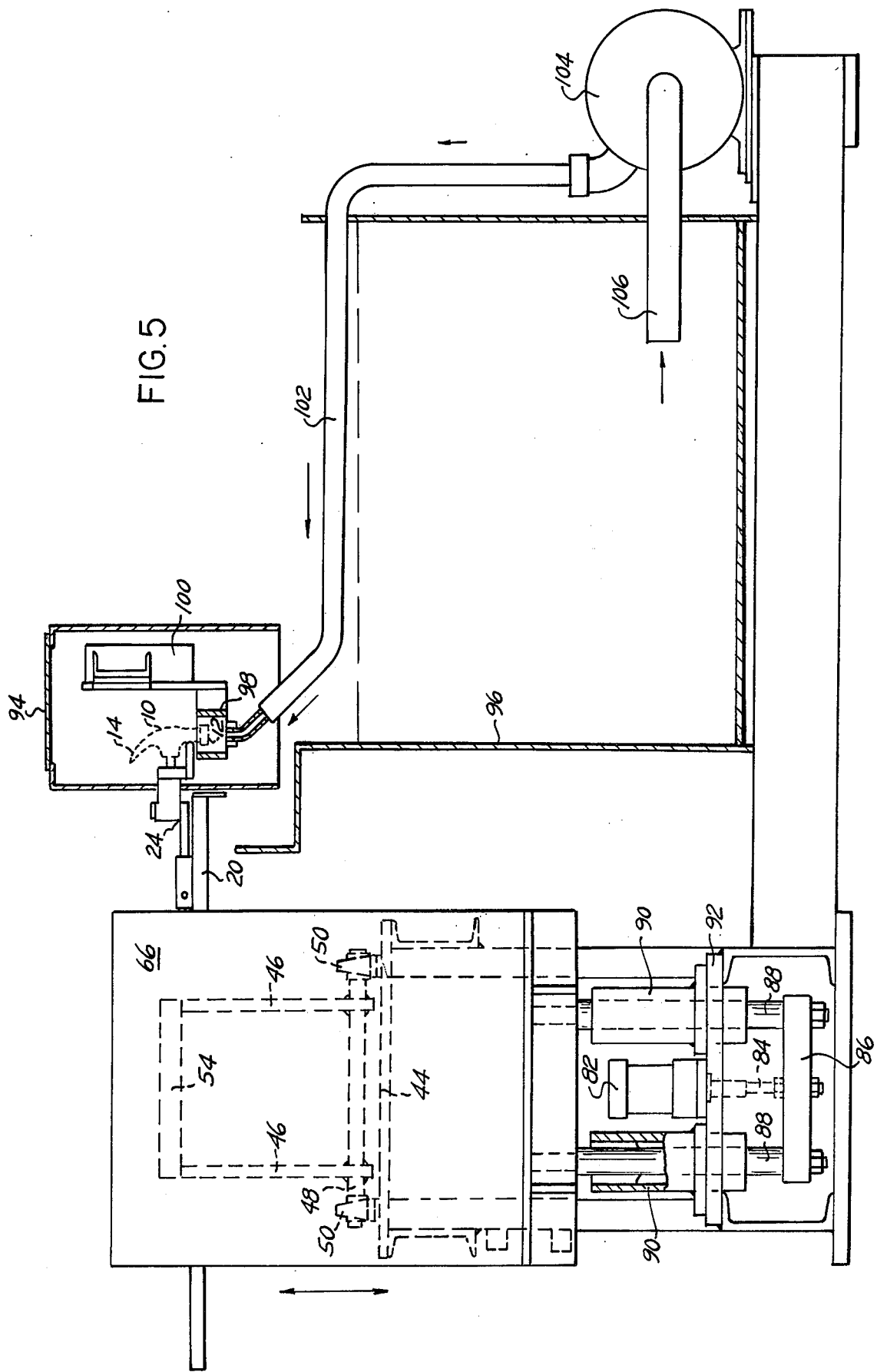
FIG. 5 is a partially sectional elevation view of a transfer station taken along line 5—5 of FIG. 1 so as to illustrate the rear of the head pre-treat station of the type illustrated in FIGS. 3 and 4 and the side view of the head quench station.

The preferred embodiment of the invention includes a plurality of work stations for performing operations on hammer heads 10 of the conventional claw type. These workpieces have a flat hammering face end 12 and a claw end 14 extending from the opposite end at an angle with respect to the central axis of the head. As shown in FIG. 3, the heads each have a handle socket 16 extending into their centers midway between the face 12 and the claw 14. As has been noted, apparatus formed in accordance with the present invention could be used with other elongated workpieces which require heat treating operations performed at their opposite ends. One obvious workpiece of this type would be a ball peen hammer wherein the peen end would be operated upon in the same manner as the claw end is operated upon in the present embodiment.

Considering the apparatus of the present invention generally, a dial index table 20 is rotated by a conventional commercially available index mechanism 22. Eight work support fixtures 24, each of which retains two hammer heads, are fixed at equal intervals about the perimeter of the table 20. In operation, the mechanism 22 intermittently rotates the table 20 through 45° rotations so that workpieces supported on the fixtures 24 are moved successively through eight different operating positions.

Referring to FIG. 1, the eight different positions are designated by letter. In position A, a pair of workpieces are manually loaded onto a fixture 24. The table then rotates in a counterclockwise direction as viewed in FIG. 1 so as to move the newly loaded workpieces to a station designated B wherein an induction pre-heat operation is formed on the faces 12 of the hammers. Next the fixture 24 is rotated to a work station C, substantially identical to work station B, and wherein induction heat apparatus brings the hammer face ends 12 up to final heat temperature. These heads are then indexed to station D wherein a flow of temperature controlled water is directed at the heated heads to quench them. The fixture then indexes to station E which again induction heats just the rim of the head in order to temper it. At station F the upper extending claw of the hammer is surrounded by an induction coil and pre-heated at a relatively low frequency to heat the thicker cross-section of the claw and finally at the next station G another coil energized at a higher frequency brings the thin end and the outer surface of the claw to its final heat temperature. At station H the hammer heads are stripped off of the support fixture 24 and fall into an oil quench bath. A conveyor extending into the bath carries the completed hammer heads to a storage section.

The structure of the work holding fixtures 24 and their manner of attachment to the perimeter of the index table is most clearly illustrated in FIG. 3. Each fixture 24 is adapted to support two hammer heads and includes two identical sections spaced horizontally from one another. Each section includes a plate 26 adapted to lie on the top surface of the dial index plate 20 and pivotably supported thereon by a horizontal rod 28 which is retained to the surface of the plate 20 by three brackets 30. The plates 26 are free to pivot upwardly about the rod 28 into the position shown by phantom lines in FIG. 3. The free ends of each of the plates 26 lie immediately adjacent the perimeter of the table 20.

A rod retainer 30 is affixed to the forward end of each of the plates 26 so that the retainer extends outwardly beyond the perimeter of the table 20. The retainer has a central hole formed through it which lies parallel to the plate 26. A hammer supporting locator rod 32 is adapted to be inserted into the hole in each retainer 30 so that the rod extends radially outwardly beyond the perimeter of the table 20. Each rod 32 has a notch 34 formed at its radially inward end and a spring-loaded plunger 36 fixed in the retainer 30 enters the notch in the rod 32 in order to releasably secure the rod within the retainer. The far end of each rod 32 carries a pair of wire springs 38 in longitudinally extending grooves in the rod formed on diametrically opposed lines. The center sections of the springs 38 project outwardly from the grooves and the ends of the springs are caught at the ends of the grooves.

The spring-loaded plungers 36 allow a pair of rods 32 having diameters complementary to the handle hole 16 of the hammer head to be retained to be inserted within the retainers 30. The hammer heads 10 are manually inserted over the ends of the rods 32 and the springs 38 bear against the internal diameters of these handle recesses to secure the hammer heads on the rods. A plate 40 having a "V" shaped end adapted to engage the narrowed sections of the hammer above the face end 12 is affixed below each retainer 30 and extends parallel to the rod 32. The forked sections 40 prevent rotation of the hammer heads on the rods 32. A pair of hammer heads are inserted on a fixture 24 at a station A and the springs 38 secure the hammer heads sufficiently to prevent them from falling off as a result of the centrifugal forces exerted during the rotation of the index table.

At the heat treat stations B, C, E, F and G it is necessary to position the hammer heads more accurately than can be done by the relatively loose engagement on the rods 32. Accordingly, those heat treat stations each include a mechanism of the type illustrated in FIGS. 3 and 4 which cooperates with the fixture 24 to more securingly retain the hammer heads during the heating operation. This mechanism is supported on the machine frame 44 which also supports the dial index mechanism 22. Each of these retention mechanisms comprises a pair of arms 46 pivotably supported with respect to the table 44 on a horizontal shaft 47 affixed to the table by a pair of bearing blocks 50. The upper end of the pair of arms may be pivoted toward or away from the table 42 under control of a hydraulically powered cylinder 48 trunion mounted to the table 44 as at 50, between the pair of arms, and having its rod end pivotably connected to an abutment 52 connected to the arms 46. An extension of the cylinder rod moves the arms 46 from their closed position, illustrated in FIG. 3, to an open position 46' illustrated in phantom lines in FIG. 3.

An upper bar 54 extends between the upper ends of the two arms 46 and carries a retention mechanism that engages a pair of hammer heads loaded on a pair of rods 32, when the arm 46 is in its closed position, to securely retain the hammer heads on the rod. The upper bar 54 carries a pair of center abutments 56 which are horizontally aligned with the two rods 32 when the arms 46 are in their closed position. The forward extension of the spring loaded abutments 56 is controlled by screw adjustments 58. The arm 54 also carries a pair of flat sections 60 which are positioned complementary to the sections 40 and are adapted to engage a hammer above the face sections 12 on their outer sides. Each of these spring loaded sections 60 may be adjusted by a pair of screw mechanisms 62.

While the dial table 20 is indexing, a suitable control mechanism moves the arms 46 to their open position. When the table has completed its index function the cylinders 48 move the arms 46 to their closed positions securely engaging the hammer head 10. This form of engagement is not required in the quench station D or the quench station H where the hammer heads are removed from the support fixtures 20. This hammer head support arrangement allows full access to the two ends of the head 12 and 14 from the lower and upper sides respectively.

Figure 6:
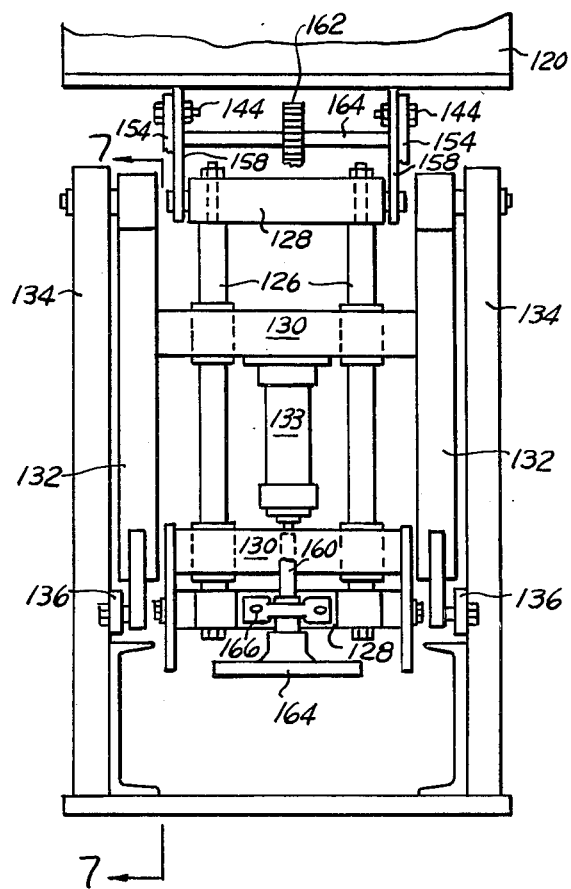
FIG. 6 is an elevational view from the rear of the claw pre-heat station taken along line 6—6 of FIG. 1.
Figure 7:
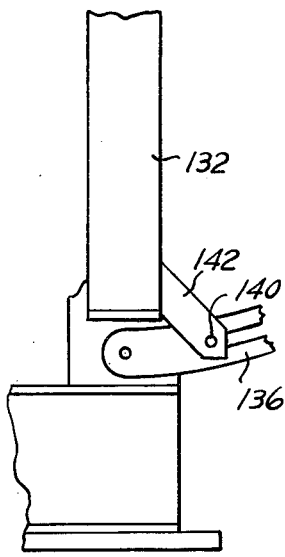
FIG. 7 is a partial side view of the claw pre-heat station taken along line 7—7 of FIG. 6 detailing a portion of the angular adjustment mechanism of that station.

Each of the stations B, C, E, F and G, where the hammer heads 10 are heated, includes what will be termed a "heat station". The heat stations employed in stations B, C and E, respectively 66, 68 and 70, are structurally identical although their electrical characteristics differ somewhat from one another. As best illustrated in FIGS. 2, 3 and 5, these stations all heat the face end of the hammer. Similarly, the mechanisms of stations F and G, while dissimilar in size, are substantially similar in structure and their mechanism is best illustrated in FIGS. 2, 6 and 7. Each of the heat stations contains electrical apparatus for connecting power to its associated induction heating coil. This mechanism may vary from installation to installation but typically will include a variable ratio transformer (not shown) having its secondary connected to the station's heating coil, and associated capacitors for power factor corrections connected to the primary. The alternating current for energizing the primaries will typically be physically separated from the heat station and connected thereto by appropriate cables, although this equipment could also be supported in the heat station.

The dual position heating bar 72 associated with each of the heat stations 66, 68 and 70 is supported on bus extensions or gussets 74 which project from the interior sides of the stations radially inward so as to extend directly below the hammer faces 12 retained on a fixture 26. Each heating coil has two horizontally displaced operation positions, one for each hammer head.

Each of the heat treat stations 66, 68 and 70 are movable vertically under the influence of cylinders 82 which have their rods 84 connected to a yoke 86 which retains a pair of shafts 88. The shafts 88 are fixed to a station support platform and are guided by cylindrical bushings 90 supported on the same frame 92 which retains the cylinder.

Normally, the heat treat stations are in their lower positions. The cylinders 82 retract their shafts to move the heat treat stations upwardly. The ceramic pin 78 contacts the bottom of the hammer face 12 and causes the fixture 26 to move upwardly about its shaft 28. This assures that the heat treat coil 72 will occupy the correct position with respect to the heat surface 12 independent of variations in individual hammer head forgings since the pivoting motion of the fixtures 26 accommodates the differing dimensions of hammer heads. Once the heat treat station is raised, bringing the coil 72 into position with respect to the hammer face, the clamp arms index into position to secure the heads and power is applied to the coil to induce eddy currents into the hammmer head which heat the hammer head to the desired temperature.

In the preferred embodiment of the invention heat stations B and C are connected in parallel to a single 50 kilowatt, 3 kilohertz generator. At station B the temperature of the face end is raised to approximately 1,000° to 1,100° F and heat station C raises the temperature to approximately 1,600° F. After the quench operation is performed at station D, which will subsequently be described in detail, the outer perimeter of the face end is again heated to temper it using a 10 kilowatt, 450 kilohertz power supply.

The head quench stations D which follows the head pre-treat B and the head final treat C is illustrated in FIG. 5. This station does not employ a locking arm 46 since the positioning of the hammer head is not critical and no substantial mechanical forces are imposed on the hammer head during quench.

As a pair of fixtures 24 rotates from the final head heating station C into the head quenching station D, they move into a three-sided hood 94 which is supported above a fluid tank 96. A pair of cylindrical open-ended quench nozzles 98 are carried on a beam 100 fixed to the heat station 70 of work station E as is best seen in FIG. 1. Accordingly, when the heat station 70 is in its lowered position, the quench chamber 98 is below the two hammer heads 10 supported on the station. When the heat station 70 rises the quench chambers 98 lift and surround the face ends 12 of the hammer heads 10.

The lower ends of the quench nozzles 98 are connected by flexible hoses 102 to the outlet of a pump 104. The inlet pipe 106 of the pump is located near the bottom of the tank 96. Appropriate heat exchanger means (not shown) may be employed to maintain the quenching fluid in the tank at an appropriate temperature.

When heat station 70 lifts, the pump 104 directs fluid to the tube 102 so as to direct it at the hammer faces 12. Dissipated fluid falls back into the tank 96.

Work stations F and G heat the opposite end of the hammer to that acted on by stations B and C; in the case of the preferred embodiment the claw 14. Station F is a pre-heat station which applies a relatively low frequency induction heat to the claws and insures uniform heating through the heavy section of the claw and station G applies a relatively higher frequency current that heats the thin end of the claw and the rest of its surface up to an appropriate temperature before the oil quenching station H. In the preferred embodiment of the invention the induction heat provided by station F is approximately 50 kilowatts at approximately 10 kilohertz and station G provides approximately 40 kilowatts at 240 kilohertz.

The heat station 120 of work station F is illustrated in FIGS. 1 and 2 and the adjustment mechanism for that heat treat station 120 is also illustrated in FIGS. 6 and 7.

The induction heating coil 122 of heat treat station F is supported at the same angle as the claw 14 makes with the central axis of the hammer. This may be at approximately 0° to 40° from the vertical depending on the claw or peen configuration. The coil 122 is supported on rigid conductive support bodies 124 which extend from the heat station 120.

The station 120 must move toward and away from hammer head 10 at the predetermined claw angle in order to allow table 20 to index and the coil 122 to surround the claw. To achieve that motion, the heat station 120 is supported on a pivotable frame 158, as shown in FIG. 6, attached to a carriage 128 supported on guide posts 126. The posts are moved by a cylinder 133 which is fixed to the cross-member of a pivot frame 132 and has its rod attached to a carriage bar 128.

The pivot frame 132 which mounts above the movable carriage 128 is adjustable angularly to the predetermined claw angle through action of a screw jack 150 upon vertical members 152 and 154 pivots 156 terminate at pivot arm 158. This arm is rigidly attached to pivot frame 132. Slotted radius arms 136 are then used to lock pivot frame 132 in this angular position.

Screw shaft 160 operated through handwheel 164 is used to position heat station 120 vertically through action of a pivotable support frame 158 as shown in FIG. 7. A screw shaft 160 is fixed at one end to handwheel 164 which in turn is mounted by a swivel bearing to the cross-member of the carriage 128. The threaded shaft end 160 is mated to the cross bar 164 whose ends are pivotably fixed to the frame 158. Motion of the screw will impart radial motion to the heat station 120 with respect to the pivot frame 132 position. The vertical position and stability of the heat station are maintained by locking slotted arm 154 to lower carriage cross member 128.

This mechanism allows the heat station 120 to move at the angle assumed by the axis of the induction heating coil 122. A substantially similar mechanism controls the motion and adjusts the angle of motion of heat station 168 which is associated with the high frequency final claw heat station G. Preferably the power supply for the heat station 120 is 50 kilowatts at 10 kilohertz which assures uniform heating through the heavy section of the claw. The power supply for the heat station 168 is preferably 40 kilowatts at 250 kilohertz which raises the surface of the claw to about 1600° to 1650° C before the oil quenching station H.

The mechanism of work station H which removes the two hammer heads from the fixture 126 and drops them into an oil quench bath is illustrated in FIGS. 8 and 10.

The quenching oil is supported in a tank 180. The frame 44 supports a hydraulic cylinder 182 on a plate 184 at work station H. The rod of the cylinder drives a frame consisting of a pair of U-shaped members 186 and 188 which are adjustably retained together. The lower U-frame member 186 carries a projection 190 that extends in horizontal alignment and behind the faces of two hammer's heads supported on a fixture 24. The upper frame section 188 carries a similar pair of projections 192 which extend behind the claws of the pair of hammer heads. When the cylinder 182 is stroked, projections 190 and 192 pull a pair of hammer heads off of their supporting rod 32 and drop them onto a sheet metal slide 194 which extends into the quench tank 180.

A conveyor belt 196 having extending abutments 198 spaced at regular intervals is supported in the quench tank 180 below the oil level underneath the slide 194. The hammer heads fall onto the conveyor and are carried out of the quench tank to a bin or another work station.

The preferred embodiment of the system thus described performs all of the necessary heat treat operations on both ends of the hammer head. It will be readily seen that the principles of the present invention are adaptable to a wide variety of other forms of workpieces.

The embodiments of the invention in which an exclusive property or privilege is claimed are defined as follows:

1. Apparatus for performing heat treatment on both ends of an elongate metallic workpiece having oppositely extending ends in an automatic manner comprising: a plurality of spaced work stations; transfer apparatus movable between each of the stations; a plurality of workpiece support devices attached to the transfer apparatus, the workpiece support devices being operative to retain the elongate workpieces at their center sections so that both ends of the workpieces project clear of the support devices and induction heating coils associated with at least two of the work stations, at least one of the induction heating coils being so positioned with respect to the transfer apparatus that it heats a first end of workpieces retained on support devices as they are moved by the transfer mechanism into operative position with respect to the station with which that coil is associated, and at least one other coil being so positioned relative to the transfer apparatus that it heats the opposite end of workpieces retained on support devices as they are moved by the transfer mechanism into operative position with respect to the station with which that coil is associated.

2. The apparatus of claim 1 wherein certain of the work stations include quenching apparatus operative to cool sections of the workpieces heated by the coils of other work stations.

3. The apparatus of claim 1 wherein the transfer apparatus comprises a circular rotary indexing table and the work support devices are attached to the table so that the workpieces project beyond the perimeter of the table.

4. The apparatus of claim 3 wherein the support devices retain the workpieces with their elongated axes parallel to the axis of rotation of the table.

5. The apparatus of claim 1 wherein the workpieces comprise hammer heads having handle receiving apertures extending normally to their elongate axes and the workpiece supporting devices include rods which extend into the apertures so as to support the hammer heads.

6. The apparatus of claim 5 wherein at least certain of the induction heating coils surround a section of a hammer head while the hammer head is disposed adjacent the work station associated with said induction coil.

7. In transfer apparatus for performing a plurality of heat treating operations on two opposed ends of hammer heads, having handle apertures, at a plurality of operating stations, means for supporting the workpieces and moving them between successive stations, comprising: a transfer mechanism; a plurality of elongated bars affixed to the transfer apparatus at spaced intervals and operative to engage the handle apertures of the hammer head; and locking means associated with at least certain of the stations operative to bear against the hammer heads on the side of the head opposite to that in which the rod is inserted so as to securely position the hammer head on the rod; inductive heating apparatus including a plurality of induction coils located at certain of said operating stations adapted to surround sections of the hammer heads; and means for moving the induction heating coil into and out of said surrounding relationship with the hammer heads.

8. The transfer apparatus of claim 7 wherein said transfer mechanism comprises a circular indexing dial table, the operation stations are arranged at regular intervals about the perimeter of the table, and the elongated bars extend radially with respect to the table with their radially outer ends projecting beyond the perimeter of the table.

9. The transfer apparatus of claim 8 further including alignment apparatus associated with each of the elongated bars and adapted to support the hammer heads with their elongate axes normal to the plane of the dial table.

10. The transfer apparatus of claim 7 wherein at least certain of the operating stations include inductive heating apparatus having induction coils adapted to surround sections of the hammer heads and means for moving the induction heating coils into and out of surrounding relationship with the hammer heads.

11. The transfer apparatus of claim 10 wherein the hammer heads have a claw at one end disposed at an angle relative to the longitudinal axis of the hammer head, at least certain of the work stations include induction heating coils adapted to surround said claws, and wherein means is provided for moving said coils at an angle relative to the longitudinal axes of the hammer heads.

12. The transfer apparatus according to claim 11 wherein at least two of said operating stations have induction heating coils adapted to be operated at a higher frequency than the other, whereby successive heating of thin and thicker sections of the claw may be carried out by said respective coils.

13. The transfer apparatus of claim 7 wherein certain of the operating stations include induction heating apparatus having coils adapted to surround the workpieces while they are disposed on the transfer mechanism, adjacent to said stations, and other stations include quench apparatus for cooling the workpieces.

14. The transfer apparatus according to claim 7 wherein said inductive heating apparatus includes induction coils positioned at successive operating stations and at least one of said opposed ends of said hammer heads is heated in both of said successive operating stations.

15. The transfer apparatus according to claim 14 wherein said hammer face end is heated in said successive operating stations and further including quench apparatus for cooling said face ends located at an operating station successive to said successive heating stations.

16. The transfer apparatus according to claim 15 wherein said induction heating apparatus further includes an induction coil located at an operating station successive to said quenching apparatus adapted to heat said hammer faces for tempering treatment thereof.

17. The transfer apparatus of claim 16 wherein the hammer head has a claw at one end disposed at an angle relative to the longitudinal axis of the hammer head, at least certain of the work stations include induction heating coils adapted to surround said claws, and wherein means is provided for moving said coils at an angle relative to the longitudinal axes of the hammer heads.

18. The transfer apparatus according to claim 17 wherein at least two of said stations have induction heating coils adapted to surround said claws, one of said coils adapted to be operated at a higher frequency than the other, whereby successive heating of thin and thicker sections of the claw may be carried out by said respective coils.

* * * * *